(12) United States Patent
Miyabe (10) Patent No.: US 8,118,127 B2
(45) Date of Patent: Feb. 21, 2012

(54) SADDLE-RIDING TYPE VEHICLE (75) Inventor: Toshimasa Miyabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 865 days.

(21) Appl. No.: 10/568,487

(22) PCT Filed: Aug. 3, 2004

(86) PCT No.: PCT/JP2004/011092
§ 371 (c)(1),
(2), (4) Date: Sep. 26, 2006

(87) PCT Pub. No.: WO2005/019018
PCT Pub. Date: Mar. 3, 2005

(65) Prior Publication Data
US 2007/0056789 A1 Mar. 15, 2007

(30) Foreign Application Priority Data
Aug. 20, 2003 (JP) ................................. 2003-208098

(51) Int. Cl.
*B62K 11/02* (2006.01)
(52) U.S. Cl. ...... 180/219; 180/311; 180/312; 280/281.1
(58) Field of Classification Search .................. 180/219, 180/312, 311; 280/210, 281.1
See application file for complete search history.

(56) References Cited

U.S. PATENT DOCUMENTS

| 4,139,072 | A | * | 2/1979 | Dawson | 180/312 |
| 4,280,582 | A | * | 7/1981 | Kouyama et al. | 180/219 |
| 4,445,585 | A | * | 5/1984 | Imani | 180/68.5 |
| 4,781,264 | A | * | 11/1988 | Matsuzaki et al. | 180/219 |
| 4,815,555 | A | * | 3/1989 | Kishi et al. | 180/227 |
| 4,989,665 | A | * | 2/1991 | Yamagiwa et al. | 164/363 |
| 5,012,883 | A | * | 5/1991 | Hiramatsu | 180/225 |
| 5,183,130 | A | * | 2/1993 | Nakamura et al. | 180/219 |
| 5,323,869 | A | * | 6/1994 | Kurayoshi et al. | 180/219 |
| 5,375,677 | A | * | 12/1994 | Yamagiwa et al. | 180/219 |

(Continued)

FOREIGN PATENT DOCUMENTS

GB 1 356 106 A 6/1974

(Continued)

OTHER PUBLICATIONS

International Search Report for PCT Application No. PCT/JP2004/011092, mailed Oct. 19, 2004.

(Continued)

*Primary Examiner* — Joanne Silbermann
*Assistant Examiner* — Maurice Williams
(74) *Attorney, Agent, or Firm* — Keating & Bennett, LLP (57) ABSTRACT

A motorcycle includes a head pipe that supports a steering shaft which is arranged to rotate freely, a body frame connected to the head pipe, and an engine supported by the body frame in a suspended state. The body frame includes a main frame that extends obliquely downward to the rear from the head pipe and a pair of left and right subframes that extend obliquely downward to the rear from the main frame. The engine includes a crankcase and a cylinder that extends obliquely upward to the front from the crankcase. The cylinder is supported by a rear end of the main frame. The crankcase is supported by portions in two places separated to the front and the rear in the respective subframes.

15 Claims, 4 Drawing Sheets

U.S. PATENT DOCUMENTS

| | | | |
|---|---|---|---|
| 5,845,728 A * | 12/1998 | Itoh et al. | 180/219 |
| 5,887,673 A * | 3/1999 | Matsumura et al. | 180/219 |
| 6,253,868 B1 * | 7/2001 | Horii et al. | 180/227 |
| 6,290,017 B1 * | 9/2001 | Ito | 180/227 |
| 6,371,236 B1 * | 4/2002 | Fukunaga | 180/219 |
| 6,422,332 B1 * | 7/2002 | Takata et al. | 180/68.3 |
| 6,481,522 B1 * | 11/2002 | Adachi | 180/219 |
| 6,502,658 B1 * | 1/2003 | Nagashii | 180/219 |
| 6,695,089 B2 * | 2/2004 | Adachi et al. | 180/311 |
| 2001/0023789 A1 * | 9/2001 | Uneta et al. | 180/218 |
| 2001/0030071 A1 * | 10/2001 | Okuma | 180/219 |
| 2004/0154852 A1 * | 8/2004 | Miyashiro et al. | 180/219 |
| 2005/0263334 A1 * | 12/2005 | Okabe et al. | 180/219 |
| 2006/0061157 A1 * | 3/2006 | Yokomizo | 297/214 |

FOREIGN PATENT DOCUMENTS

| | | |
|---|---|---|
| JP | 55-68488 | 5/1980 |
| JP | 63-315382 A | 12/1988 |
| JP | 03-118287 | 5/1991 |
| JP | 05-330474 | 12/1993 |
| JP | 05-330475 | 12/1993 |
| JP | 08-067285 | 3/1996 |
| JP | 2001-278146 | 10/2001 |
| JP | 2002-037169 A | 2/2002 |

OTHER PUBLICATIONS

Official communication issued in counterpart European Application No. 04771146.0, mailed on Jan. 29, 2009.

* cited by examiner

SADDLE-RIDING TYPE VEHICLE

BACKGROUND OF THE INVENTION

1. Field of the Invention

The present invention relates to a saddle riding type vehicle, such as a motorcycle.

2. Description of the Related Art

Conventionally, there is known a saddle riding type vehicle including a head pipe that supports a steering handle that is capable of rotating, a frame that extends obliquely downward to the rear from the head pipe, and an engine supported by the frame in a suspended state. As a saddle riding type vehicle of this type, for example, motorcycles disclosed in JP-A-08-067285, JP-A-05-330474, and JP-A-05-330475 described below are known.

The motorcycle disclosed in JP-A-08-067285 includes a head pipe and a pair of left and right main frames that extend obliquely downward to the rear from the head pipe. Brackets are coupled to rear portions of the main frames. An engine is supported by the left and the right main frames and brackets in a suspended state. The motorcycle also includes rear swing arms that support a rear wheel. The rear swing arms are supported by the brackets via a pivot shaft to move up and down freely.

In such a saddle riding type vehicle, it is desired to reduce the weight of a body frame or reduce the width of the vehicle while maintaining the strength of the body frame. For improving convenience in getting on and off the vehicle, it is also desired to keep a portion ahead of a seat low.

However, in the conventional saddle riding type vehicle, the engine is supported by the pair of left and right main frames and brackets in an upper portion and a rear portion of a crankcase of the engine. Consequently, the main frames and the brackets are required to have a large degree of rigidity. Therefore, in order to maintain the rigidity of the main frames and the brackets, it is necessary to increase the thickness of the main frames and the brackets. However, when the thickness of the main frames and the like is increased, it is difficult to reduce the weight of the body frame.

In the conventional saddle riding type vehicle, both the engine and the rear swing arms are held between the pair of left and right brackets. Consequently, an interval between the left and the right brackets is increased and the main frame extends outward in the left and right directions. Therefore, it is difficult to reduce the width of the vehicle (a reduction in the width in a vehicle width direction).

SUMMARY OF THE INVENTION

In order to overcome the problems described above, preferred embodiments of the present invention provide a reduction in the weight of a body frame while maintaining the strength of the body frame in a saddle riding type vehicle. Another preferred embodiment of the present invention provides a reduction in the width of the vehicle while maintaining the strength of the body frame. In still another preferred embodiment of the present invention, a portion ahead of a seat of the vehicle is low.

A saddle riding type vehicle according to a preferred embodiment includes a head pipe that supports a steering shaft that is arranged to rotate freely, a body frame including a main frame that is connected to the head pipe and extends obliquely downward to the rear and a pair of left and right subframes that are connected to the main frame and extend obliquely downward to the rear, and a motor supported by the main frame and the respective subframes in a suspended state.

According to the saddle riding type vehicle of the above-described preferred embodiment, the motor is supported by the main frame and both the subframes, whereby the motor is arranged to be connected to the main frame and both the left and the right subframes. As a result, since the main frame and the subframes are reinforced by the motor, it is possible to keep the strength of the main frame itself or the subframes themselves low because of reinforcement by the motor. Therefore, it is possible to achieve a reduction in the size or a reduction in the weight of the body frame while maintaining the strength of the body frame.

Preferably, a connecting portion of the main frame and the subframes is located ahead of a portion supporting the motor in the main frame.

Consequently, a portion between a front end portion of the main frame and a portion supporting the motor is reinforced by the subframes. Thus, the strength of the main frame is improved. Note that a necessary strength distribution of the main frame differs for each vehicle. However, it is possible to make a strength distribution of the main frame suitable or optimum by adjusting a connecting position of the subframes to the main frame appropriately.

Preferably, the head pipe is connected to a front end of the main frame and a cross sectional area of the main frame changes along a longitudinal direction of the main frame such that the front end is larger than a rear end.

Note that the change in the cross sectional area of the main frame may be continuous or stepwise along the longitudinal direction of the main frame. A form of the change in the cross sectional area is not specifically limited.

Consequently, the main frame is relatively thick on the front end connected to the head pipe. Thus, it is possible to secure a greater strength of the main frame against a bending moment On the other hand, since the rear end of the main-frame is relatively thin, when a body cover on a front side of the seat is arranged above the rear end of the main frame, it is possible to keep the body cover low.

Preferably, the main frame supports the motor at the rear end of the main frame.

Consequently, it is possible to reduce the length of the main frame.

It is preferable that the subframes are bent convexly downward and support the motor at least in one place near the bent portions.

Consequently, the motor functions as a reinforcing member to increase the strength of the bent portions of the subframes. Since the strength of the subframes increases, it is possible to achieve a reduction in the size or a reduction in the weight of the subframes. Since it is possible to reduce the size of the subframes, it is possible to keep the body cover on the front side of the seat low.

Preferably, the subframes are bent convexly downward and support the motor at least in one place further toward a rear end than the bent portions.

Consequently, the motor functions as a reinforcing member and the strength in portions further on the rear end of the bent portions in the subframes increases. Since the strength of the subframes increases, it is possible to achieve a reduction in the size and a reduction in the weight of the subframes. Since it is possible to reduce the size of the subframes, it is possible to keep the body cover on the front side of the seat low.

Preferably, the saddle riding type vehicle includes a rear wheel and rear arms that support the rear wheel and extend substantially in a front to rear direction, the subframe is bent convexly downward, and both a portion of the motor and the rear arms are supported at the rear ends of the subframes.

Consequently, since a portion of the motor is supported together with the rear arms, it is possible to simplify a supporting structure for the motor and the rear arms. Since the motor and the rear arms are supported together, in using brackets for support, it is possible to reduce a size of the brackets compared with a case in which the motor and the rear arms are supported separately. Since it is possible to reduce a size of the brackets in this way, it is possible to increase the strength of the entire body frame.

Preferably, the subframes are bent convexly downward and the saddle riding type vehicle further includes rear side frames that are connected to a portion further toward the rear end than the bent portions of the subframes and extend obliquely upward to the rear.

Consequently, the rear side portions of the subframes are reinforced by the rear side frames. It is possible to reduce the size of the subframes because the subframes are reinforced. Thus, it is possible to keep the body cover on the front side of the seat low.

The saddle riding type vehicle may include plural rear side frames that are connected to the rear ends of the subframes, respectively, to extend obliquely upward to the rear and are connected to one another.

Consequently, the rear side portions of the subframes are reinforced by the plural rear side frames connected to one another. Thus, strength of the subframes is increased. Therefore, it is possible to achieve a reduction in the size or a reduction in the weight of the subframes. It is possible to keep the body cover on the front side of the seat low through the reduction in the size of the subframes.

Preferably, the subframes support the motor at least in one place near connecting portions to which the rear side frames are connected.

Consequently, a portion of the motor is supported by portions reinforced by the rear side frames in the subframes. Thus, it is possible to achieve a reduction in the size or a reduction in the weight of the subframes themselves. Since it is possible to reduce the size of the subframes, it is possible to keep the body cover on the front side of the seat low.

Preferably, the motor is an internal combustion engine having a crankcase and a cylinder that extends forward or obliquely upward to the front from the crankcase, the cylinder is supported by the main frame, and the crankcase is supported by the subframes.

Consequently, since the cylinder located on the front side of the motor is supported by the main frame and the crankcase located on the rear side of the motor is supported by the subframes, the motor is supported by the main frame and the subframes in a well-balanced state. Thus, it is possible to manufacture the main frame and the subframes in appropriate lengths and manufacture the main frame so as to be relatively short. Therefore, it is possible to achieve a reduction in the size and a reduction in the weight of the body frame while maintaining the strength of the body frame.

Preferably, the cylinder extends obliquely upward to the front from the crankcase such that an axis of the cylinder extends obliquely in an upward direction, the subframes are bent convexly downward, and front side portions further on the front side than the bent portions in the subframes extend substantially parallel to the axis of the cylinder.

Consequently, since the front side portions of the subframes extend along the cylinder of the internal combustion engine, it is possible to arrange the front side portions of the subframes in positions near the cylinder. Thus, it is possible to reduce the height of the subframes and keep the body cover covering the subframes low.

Preferably, the cylinder extends obliquely upward to the front from the crankcase such that the axis of the cylinder extends obliquely in the upward direction, the subframes are bent convexly downward, and the bent portions of the subframes are located above a boundary portion of the cylinder and the crankcase in the internal combustion engine.

Consequently, since the subframes are arranged along the cylinder and the crankcase of the internal combustion engine, efficient use of space is achieved. Since it is possible to arrange the subframes in positions near the combustion engine, it is possible to keep the body cover covering the subframes low.

Another preferred embodiment of the saddle riding type vehicle according to the present invention includes a head pipe that supports a steering shaft arranged to rotate freely, a body frame including a main frame that is connected to the head pipe and extends obliquely downward to the rear and a pair of left and right subframes that are connected to the main frame and extend obliquely downward to the rear, and a motor supported in positions of two places separated in a front to rear direction in the respective subframes in a suspended state.

According to the saddle riding type vehicle of the present preferred embodiment, the motor serves as a reinforcing member and the subframes are reinforced at least in the two places separated to the front and the rear. Thus, it is possible to keep the strength of the subframes themselves low because the subframes are reinforced by the motor. Therefore, it is possible to achieve a reduction in the size or a reduction in the weight of the body frame while maintaining the strength of the body frame.

Preferably, the motor is an internal combustion engine including a crankcase and a cylinder that extends forward or obliquely upward to the front from the crankcase, the cylinder is supported by the main frame, and the crankcase is supported by the subframes.

Consequently, since the cylinder located on a front side of the motor is supported by the main frame and the crankcase located on a rear side of the motor is supported by the subframes, the motor is supported by the main frame and the subframes in a well-balanced state. Thus, it is possible to manufacture the main frame and the subframes in appropriate lengths and manufacture the main frame so as to be relatively short. Therefore, it is possible to achieve a reduction in the size or a reduction in the weight of the body frame while maintaining the strength of the body frame.

Still another preferred embodiment of the saddle riding type vehicle according to the present invention is a saddle riding type vehicle including a head pipe that supports a steering shaft arranged to rotate freely, a body frame that extends obliquely downward to the rear from the head pipe, and a motor supported by the body frame in a suspended state. The body frame includes at least a pair of left and right side frames and the saddle riding type vehicle includes a rear wheel, rear arms that support the rear wheel and extend substantially in a front to rear direction, left and right brackets fixed to the left and the right side frames, respectively, and a pivot shaft that penetrates through both the brackets, both the rear arms, and the motor and attaches both the rear arms and the motor to both the brackets in a state in which the left and the right brackets are interposed between the left and the right rear arms and the motor, respectively.

According to the saddle riding type vehicle of the present preferred embodiment, the brackets fixed to the left and the right frames are interposed between the motor and the left and the right rear arms, respectively. Thus, it is possible to reduce an interval between the left and the right brackets compared with a case in which the brackets are provided on an outer side of the motor and the rear arms. Therefore, it is possible to reduce intervals on the left and the right of the side frames and achieve a reduction in the width of the vehicle.

The body frame may include a main frame that is connected to the head pipe and extends obliquely downward to the rear and a pair of left and right subframes that are connected to the main frame and extend obliquely downward to the rear. The side frames may be the same as the subframes.

Consequently, the motor functions as a reinforcing member to increase the strength of the subframes. Thus, it is possible to achieve a reduction in the size or a reduction in the weight of the frames.

Preferably, a portion of the motor is supported by the main frame.

Consequently, since the motor functions as the reinforcing member, the strength of the main frame is increased. Thus, it is possible to achieve a further reduction in the size or reduction in the weight of the body frame.

As described above, according to the preferred embodiments of the present invention, since the motor is supported by the main frame and the left and the right subframes, it is possible to use the motor as the reinforcing member. Thus, it is possible to achieve a reduction in the size and a reduction in the weight of the body frame while maintaining the strength of the body frame.

If the motor is supported at two positions in the front and the rear of the left and the right subframes, it is possible to reinforce the two positions in the front and the rear of the subframes with the motor and achieve a reduction in the size and a reduction in the weight while maintaining the strength of the body frame.

If left and the right brackets fixed to a pair of left and right side frames, respectively, are interposed between the motor and the left and the right rear arms, respectively, and then the motor and the left and the right rear arms are attached to the brackets together, it is possible to reduce an interval between the left and the right side frames and achieve a reduction in the width of the vehicle.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A first preferred embodiment of the present invention will be hereinafter explained on the basis of the drawings.

Figure 1:
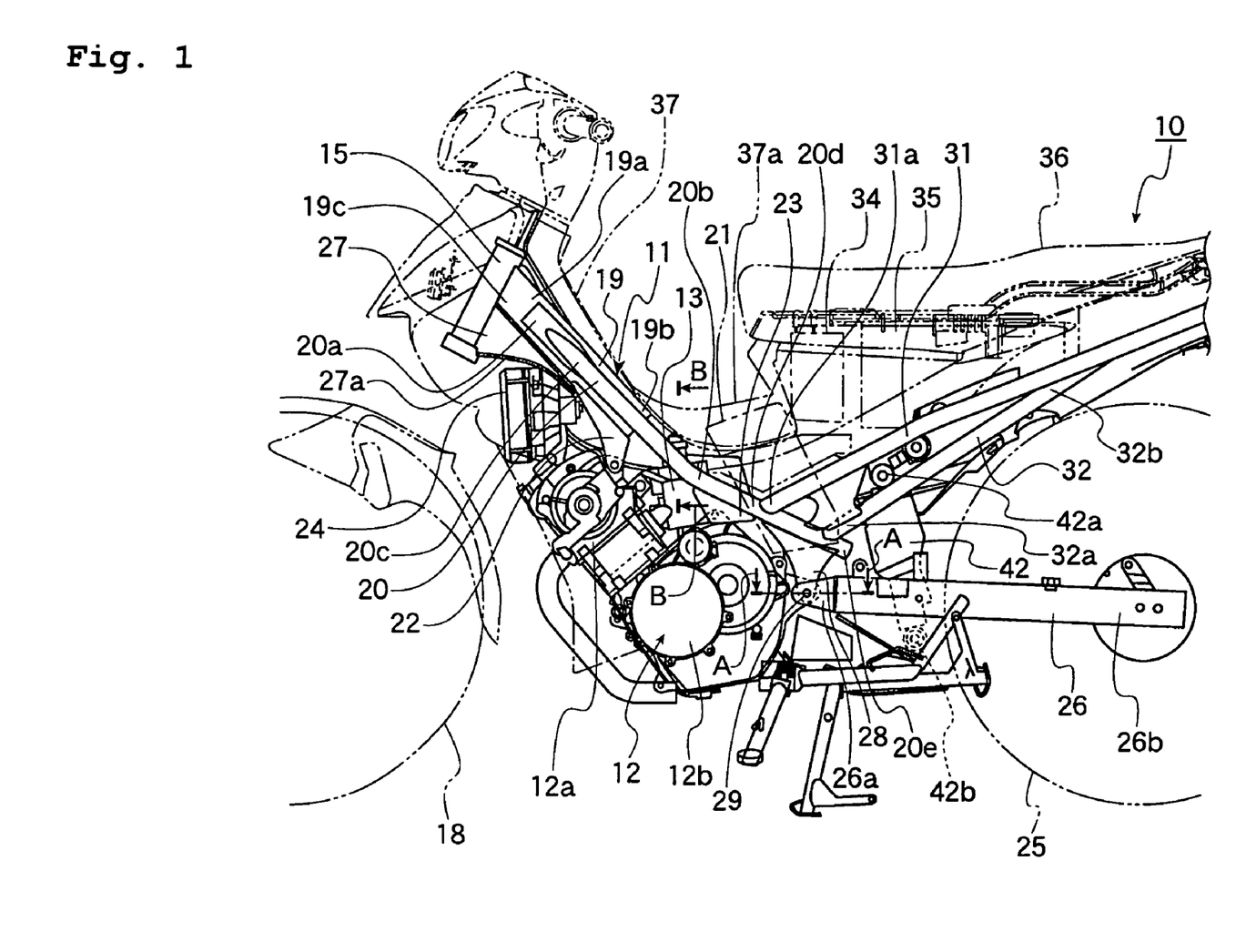
FIG. 1 is a schematic side view of a motorcycle according to a first preferred embodiment of the present invention.

As shown in FIG. 1, a saddle riding type vehicle according to the first preferred embodiment is a motorcycle 10 of a so-called underbone type. The motorcycle 10 includes a body frame 11 defining a skeleton and an engine 12 supported by the body frame 11 in a suspended state.

A head pipe 15 is provided at a front end of the body frame 11. A non-illustrated steering shaft is inserted into the head pipe 15 so as to rotate freely. A non-illustrated front fork is provided on a lower side of the steering shaft. A front wheel 18 is supported by the body frame 11 so as to be capable of rotating via the front fork and the like.

A main frame 19 is fixed to the head pipe 15. The main frame 19 extends obliquely downward to the rear from the head pipe 15. In order to maintain sufficient strength, the main frame 19 is relatively thick and a section of the main frame 19 preferably has a hollow, substantially rectangular shape. In this preferred embodiment, the main frame 19 is constructed by assembling a pair of left and right beam-shaped members. Specifically, the main frame 19 includes a pair of left and right beam-shaped members that extend obliquely downward to the rear and are bent 90 degrees at both top and bottom ends. The main frame 19 is constructed by joining bent portions of the left and the right beam-shapedmembers in a left to right direction. However, the method of forming the hollow main frame 19 is not limited at all, and other forming methods may be used.

A cross-sectional area of the main frame 19 is different at a front end 19c and at a rear end 19b. The cross-sectional area of the main frame 19 is larger at the front end 19c than the rear end 19b and changes along a longitudinal direction of the main frame 19. Note that the cross-sectional area of the main frame 19 may change continuously along the longitudinal direction of the main frame 19 or may change stepwise.

A gusset 27 is fixed to a lower side of a front half portion of the main frame 19. The gusset 27 is arranged between the main frame 19 and the head pipe 15.

A bracket 22 is fixed to a lower side of the rear end 19b of the main frame 19. A cylinder 12a of the engine 12 is attached to the bracket 22 preferably via a bolt and a nut, for example. In other words, the cylinder 12a of the engine 12 is supported by the main frame 19 via the bracket 22.

The engine 12 is preferably a water cooled engine. The engine 12 includes the cylinder 12a and a crankcase 12b. The cylinder 12a extends obliquely upward to the front from the crankcase 12b. The cylinder 12a includes a cylinder block and a cylinder head attached to an upper side of the cylinder block. The cylinder 12a is supported in an orientation with an axial direction of the cylinder 12a and a longitudinal direction of the main frame 19 substantially parallel to each other.

A carburetor 13 is disposed behind the cylinder 12a. The carburetor 13 is arranged near a lower side of the rear end 19b of the main frame 19, that is, on an extension line to the rear of the main frame 19. An air cleaner 21 that purifies the outside air and supplies the outside air to the carburetor 13 is disposed on a rear side of the carburetor 13. The air cleaner 21 is arranged in a position near the carburetor 13, that is, a position adjacent to the carburetor 13. The air cleaner 21 preferably has a substantially rectangular parallelepiped shape, for example. As shown in FIG. 1, the air cleaner 21 is arranged obliquely such that an upper end side thereof is positioned further in the front of the vehicle than a lower end side thereof.

A battery 34 is arranged behind and above the air cleaner 21. The battery 34 is located on a lower side of a seat 36, to be accessed by opening the seat 36.

In this way, since the air cleaner 21 is arranged near the rear of the carburetor 13, an air intake passage is made linear and simplified. Thus, it is possible to improve performance of the engine 12. The air cleaner 21 and the battery 34 are relatively large components. When the air cleaner 21 and the battery 34 are arranged in a vehicle width direction, a vehicle width tends to be large. However, in the motorcycle 10, since the air cleaner 21 and the battery 34 are arranged in a front to rear direction of the vehicle, it is possible to control the vehicle width and reduce the width of the vehicle. Moreover, since the air cleaner 21 is arranged in a tilted orientation, it is possible to effectively use a space on a lower side of the battery 34 as a part of the space for the air cleaner 21. Therefore, it is possible to control the length in the front to rear direction of the vehicle and the height of the vehicle while securing a space for the air cleaner 21.

A fuel tank 35 is disposed behind the battery 34 and below the seat 36.

A radiator 24 that cools cooling water supplied to the engine 12 is arranged above the cylinder 12a of the engine 12 and below the main frame 19. A non-illustrated bracket is provided in the gusset 27. The radiator 24 is supported by the body frame 11 via this bracket.

In the vehicle of the underbone type, that is, a vehicle in which the main frame 19 inclines obliquely downward at a relatively steep angle, there is a problem described below concerning a space for locating the radiator 24. In the vehicle of the underbone type, when it is attempted to arrange the radiator 24 below the main frame 19 and above the cylinder head, a space for locating the radiator 24 is relatively limited. Thus, in the motorcycle 10, a lower edge 27a of the gusset 27 is bent to be recessed upward. In other words, the lower edge 27a of the gusset 27 is bent upward. Consequently, the space for locating the radiator 24 increases to prevent contact of the gusset 27 and the radiator 24. Since the lower edge 27a of the gusset 27 is bent upward, the gusset 27 and the radiator 24 are less likely to interfere with each other. It is possible to efficiently arrange the gusset 27 in a limited space. Since this makes it possible to arrange the gusset 27 with a suitable size in a suitable position, it is possible to improve the strength of the main frame 19.

Figure 2:
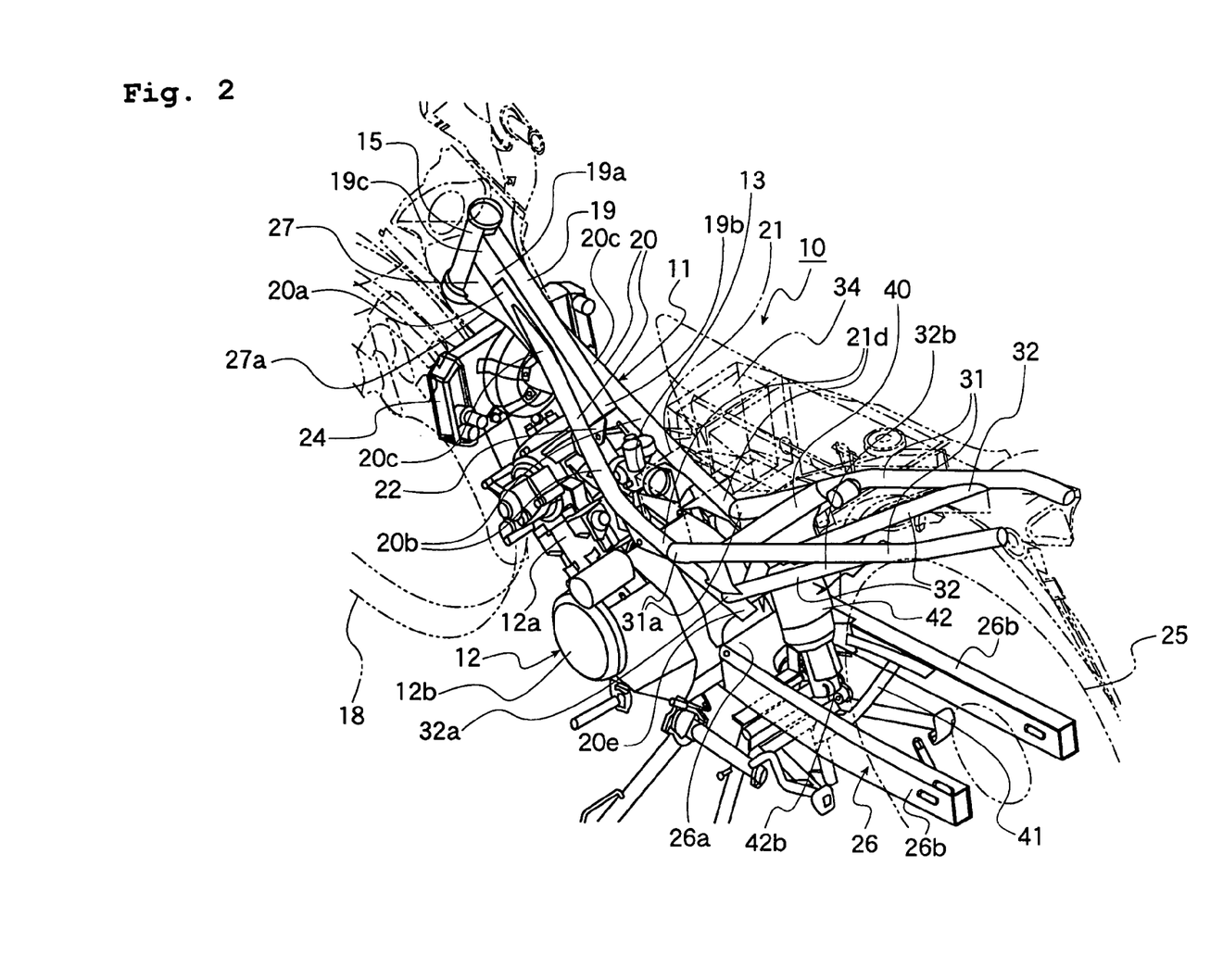
FIG. 2 is a perspective view of a motorcycle according to the first preferred embodiment of the present invention.

As shown in FIG. 2, subframes 20 are fixed to both side portions 19a on the left and the right of the main frame 19. Specifically, a pair of subframes 20 is provided on the left and the right of the main frame 19, and front ends 20a of the respective subframes 20 are fixed near the center in the longitudinal direction of the main frame 19. Most portions of the subframes 20 preferably have a substantially round pipe shape. A cross-section of the subframes 20 is smaller than a cross-section of the mainframe 19. A shape of the front ends 20a of the subframes 20 is changed from the pipe shape to a planar shape toward a front end thereof. Portions of the planar shaped subframes are joined to the side portions 19a of the main frame 19 by welding or the like in a state in which the portions are in surface contact with the side portions 19a.

The subframes 20 have a bent structure. Specifically, as shown in FIG. 1, substantially the center in the longitudinal direction of the subframes 20 is bent so as to be projected downward. Bent portions 20b are located above a boundary portion of the crankcase 12b and the cylinder 12a of the engine 12. Front side portions 20c, further toward the front ends than the bent portions 20b, extend substantially parallel to an axial direction of the cylinder 12a of the engine 12. Rear side portions 20d, further toward a rear end than the bent portions 20b, are inclined more gently than the front side portions 20c.

Brackets 23 are fixed to rear side portions 20d (portions near the rear of the bent portions 20b) of the subframes 20. The crankcase 12b of the engine 12 is attached to the brackets 23 preferably via a bolt and a nut, for example.

The rear side portions 20d of the subframes 20 extend to the rear of the engine 12. Metal brackets 28 are fixed to rear ends 20e of the rear side portions 20d of the subframes 20. Both the crankcase 12b of the engine 12 and rear arms 26 are supported by the brackets 28.

Figure 3:
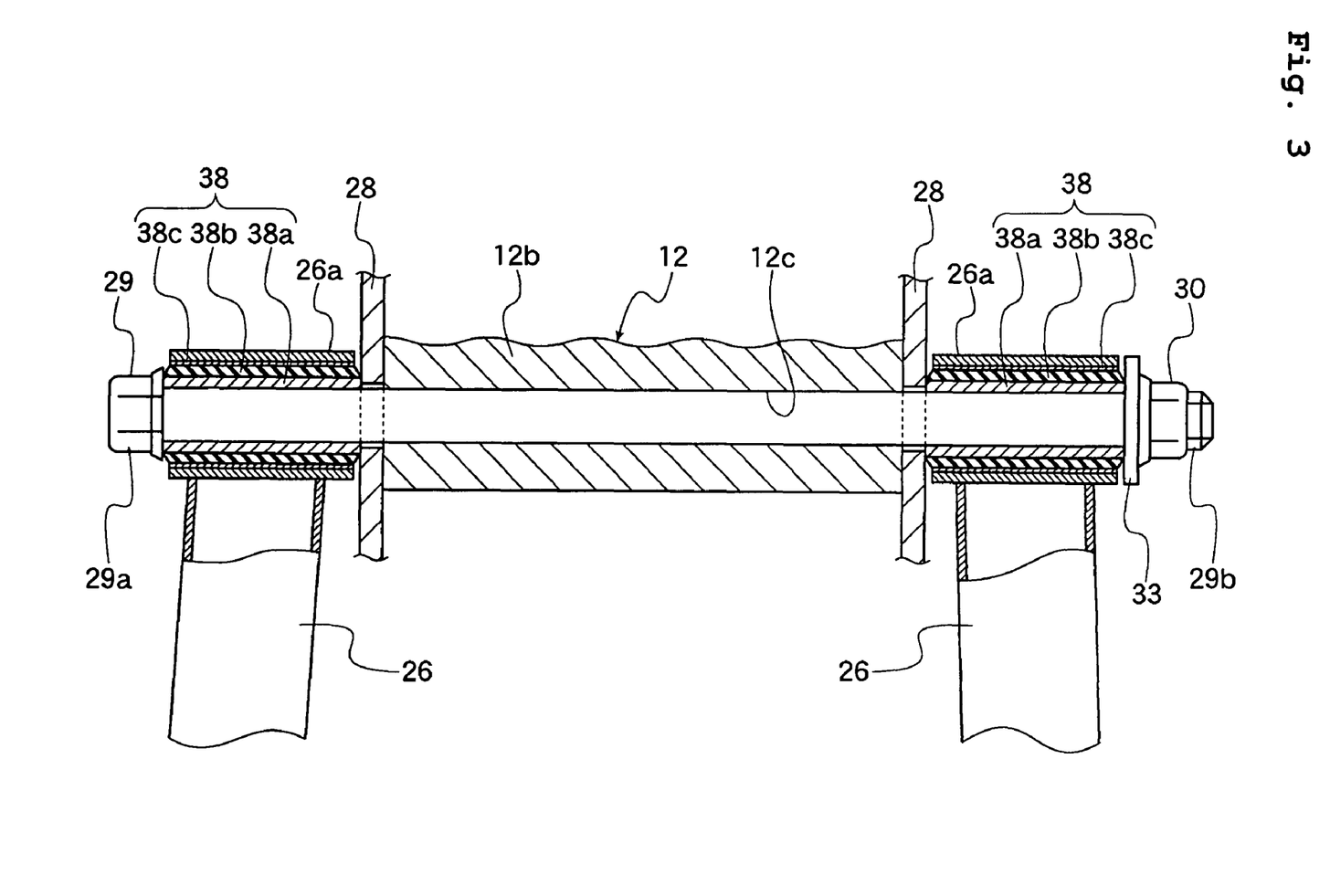
FIG. 3 is a sectional view along line A-A in FIG. 1.

Specifically, as shown in FIG. 1, the downward extending brackets 28 are fixed to the rear ends 20e of the pair of left and right subframes 20. A pivot shaft 29 is suspended between the brackets 28. As shown in FIG. 3, a bolt head 29a is provided at one end of the pivot shaft 29 and a male thread portion 29b is provided at the other end. The male thread portion 29b is screwed in a nut 30. The crankcase 12b of the engine 12 and front end cylindrical portions 26a of the rear arms 26 are supported by the pivot shaft 29 which are supported by the brackets 28.

Specifically, as shown in FIG. 3, on the left side of the engine 12, the front end cylindrical portion 26a of the rear arm 26 on the left side is arranged between the bolt head 29a of the pivot shaft 29 and the bracket 28. The front end cylindrical portion 26a is supported by the pivot shaft 29 via a bushing 38 with internal and external cylinders and is capable of rotating around the pivot shaft 29 within a predetermined angle range. The bushing 38 with internal and external cylinders includes an inner cylinder 38a and an outer cylinder 38c preferably made of iron, for example, and an intermediate cylinder 38b preferably made of rubber, for example, interposed between the inner cylinder 38a and the outer cylinder 38c. The pivot shaft 29 is inserted into the inner cylinder 38a and the outer cylinder 38c is pressed into the front end cylindrical portion 26a of the rear arm 26. Consequently, when the front end cylindrical portion 26a of the rear arm 26 rotationally moves around the pivot shaft 29, the intermediate cylinder 38b made of rubber of the bushing 38 with internal and external cylinders is elastically deformed to allow rotational movement of the rear arm 26 and to regulate rotational movement of the rear arm 26 exceeding a predetermined range.

The front end cylindrical portion 26a is also provided in the rear arm 26 on the right side of the engine 12. The front end cylindrical portion 26a is arranged between the bracket 28 on the right side and a washer 33 on the nut 30 side. The front end cylindrical portion 26a of the rear arm 26 on the right side is also supported to rotationally move freely about the pivot shaft 29 via the bushing 38 with internal and external cylinders and rotationally moves in the predetermined angle range.

Moreover, the crankcase 12b of the engine 12 is held between the pair of left and right brackets 28, 28. A through-hole 12c extending to the left and the right is provided in the crankcase 12b and the pivot shaft 29 is inserted through the through-hole 12c. With such an arrangement, the crankcase 12b is supported by the pivot shaft 29.

The crankcase 12b of the engine 12, the left and the right brackets 28, and the left and the right inner cylinders 38a are integrally combined by screwing the male thread portion 29b of the pivot shaft 29 in the nut 30. The inner cylinder 38a on the right side is held between the bracket 28 and the nut 30 portion (more accurately, the washer 33). The inner cylinder 38a on the left side is held between the bracket 28 and the bolt head 29a.

As described above, the engine 12 is attached to the bracket 22 fixed to the main frame 19 and the brackets 23 and the brackets 28 fixed to the left and the right subframes 20 (see FIG. 1). In this way, the engine 12 is suspended in a position of one place on the main frame 19 and suspended in positions of two places separated to the front and the rear on the left and the right subframes 20. As a result, the engine 12 is supported in a state in which the engine 12 is placed between both the frames 19 and 20. Both the frames 19 and 20 are located in a state in which the frames 19 and 20 are astride the engine 12.

First ends of seat rails 31 are connected to the rear side portions 20d of the subframes 20. Specifically, front ends 31a of the seat rails 31 are welded in substantially the center in the longitudinal direction of the rear side portions 20d of the subframes 20 (a position between both the brackets 23 and 28). Front ends 32a of back stays 32 are welded to the rear ends 20e of the rear side portions 20d of the subframe 20. The seat rails 31 and the back stays 32 define a rear side frame extending obliquely upward to the rear and preferably have a substantially round pipe shape, respectively. However, the shapes of the seat rails 31 and the back stays 32 may be other shapes, such as a substantially square pipe shape. A material of the seat rails 31 and the back stays 32 may be iron, aluminum, or other suitable materials. Rear ends 32b of the back stays 32 are connected to intermediate portions of the seat rails 31.

As shown in FIG. 2, a cross member 40 extending in the vehicle width direction is fixed to the pair of left and right seat rails 31. The cross member 40 is placed between the left and the right seat rails 31. A cross member 41 extending in the vehicle width direction is also placed between a pair of left and right extended portions 26b of the rear arms 26. The cross member 41 is preferably made of a pipe-like member that extends in substantially a U-shape. Both ends of the pipe-like member are joined to the extended portions 26b.

A rear cushion 42 is disposed between the cross member 40 and the cross member 41. An upper end 42a of the rear cushion 42 is coupled to the cross member 40 on the seat rail 31 side so as to rotate freely. A lower end 42b of the rear cushion 42 is coupled to the cross member 41 on the rear arm 26 side so as to rotate freely. In the motorcycle 10, vibration from the rear wheel 25 is absorbed by the rear cushion 42.

Figure 4:
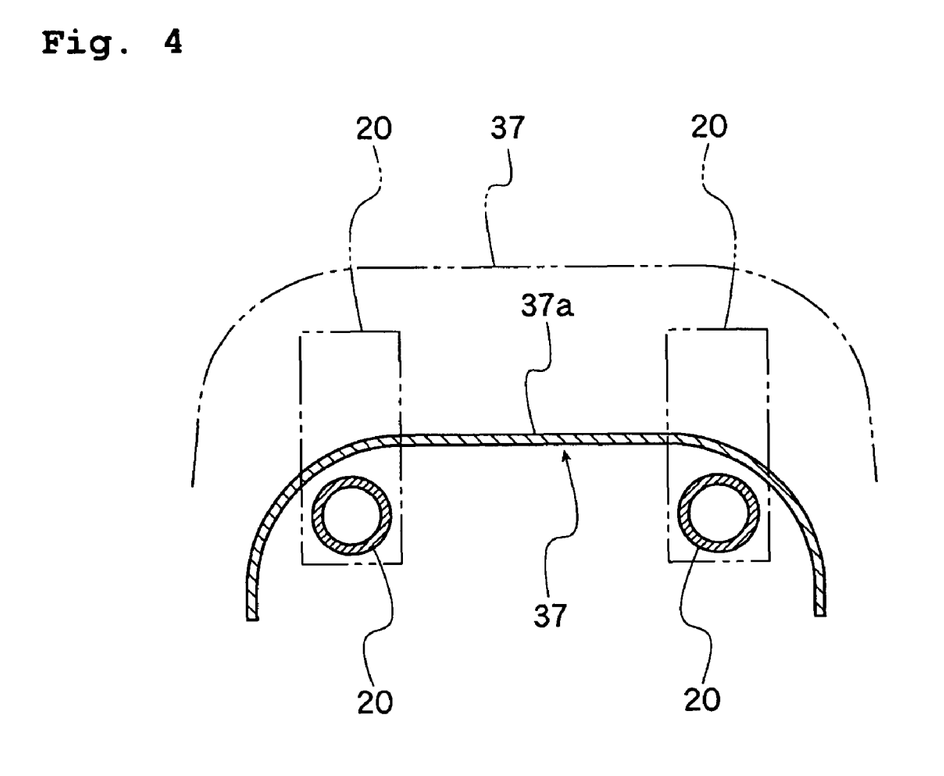
FIG. 4 is a sectional view along line B-B in FIG. 1.

As shown in FIG. 1, a leg shield 37 covering upper sides of the main frame 19 and the left and the right subframes 20 is disposed in front of the seat 36 (see FIG. 4 as well).

The construction of the motorcycle 10 according to the first preferred embodiment is as described above.

In the motorcycle 10, the engine 12 is fixed between the main frame 19 and the subframes 20. Thus, the engine 12 also functions as a reinforcing member for the body frame 11. Therefore, it is possible to achieve a reduction in the size and a reduction in the weight of the body frame 11 while maintaining the strength of the vehicle.

As shown in FIG. 4, according to the motorcycle 10, it is possible to form the subframes 20 to have a thin round pipe shape. Thus, it is possible to keep a center tunnel portion 37a of the leg shield 37 in front of the seat 36 low. In other words, as indicated by an alternate long and two short dashes line in FIG. 4, when the subframes 20 are relatively thick square pipes in order to increase strength, and since positions of upper surfaces of the square pipes are elevated, a position of the leg shield 37 is also elevated as indicated by an alternate long and two short dashed line in the figure. On the other hand, in the motorcycle 10, since the subframes 20 are constructed of a substantially round pipe and the thickness of the subframes 20 is reduced, it is possible to reduce the height of the leg shield 37.

According to the motorcycle 10, connecting positions of the subframes 20 and the main frame 19, that is, positions of the front ends 20a of the subframes 20 are ahead of a supporting portion of the engine 12 in the main frame 19, that is, a position of the bracket 22. In this way, since the front ends 20a of the subframes 20 are connected ahead of the supporting portion of the engine 12 (a portion where the bracket 22 is disposed) in the main frame 19, a portion between the front end 19c of the main frame 19 and the supporting portion is reinforced by the subframes 20. Thus, it is possible to increase the strength of the main frame 19. It is possible to effectively increase the strength of the main frame 19 by determining a connecting position of the subframes 20 according to a necessary strength distribution of the main frame 19.

The main frame 19 is thicker at the front end 19c than at the rear end 19b. Thus, on the front end 19c connected to the head pipe 15, it is possible to sufficiently secure a strength against a bending moment. On the other hand, it is possible to provide a thin rear end 19b. Since it is possible to provide a thin rear end 19b in this way, it is possible to keep the center tunnel portion 37a of the leg shield 37 low.

The cylinder 12a of the engine 12 is supported by the main frame 19 having a large strength. Thus, it is possible to reduce the length of the main frame 19 compared with a case in which the cylinder 12a of the engine 12 is supported by the subframes 20. Therefore, it is possible to achieve a reduction in the weight of the body frame 11 while securing the necessary strength.

The cylinder 12a of the engine 12 is supported by, in particular, a portion near the rear end of the main frame 19, that is, the rear end 19b. Thus, it is possible to reduce the length of the main frame 19 and achieve a further reduction in the weight of the body frame 11.

The front side portions 20c of the subframes 20 extend substantially in parallel to the axial direction of the cylinder 12a of the engine 12. Thus, it is possible to effectively bring the front side portions 20c of the subframes 20 close to the cylinder 12a. As a result, it is possible to reduce the height of the subframes 20. Therefore, it is possible to keep the center tunnel portion 37a of the leg shield 37 low.

The cylinder 12a of the engine 12 extends obliquely upward from the crankcase 12b. The engine 12 is in a shape bending upward as a whole. The bent portions 20b of the subframes 20 are located above the boundary portion of the cylinder 12a of the engine 12 and the crankcase 12. Thus, the subframes 20 are arranged along the bent shape of the engine 12. Therefore, since it is possible to arrange the subframes 20 at positions near the engine 12, it is possible to keep the center tunnel portion 37a of the leg shield 37 lower.

According to the motorcycle 10, middle portions of the subframes 20 are bent so as to be recessed downward. The engine 12 is supported near the bent portions 20b of the subframes 20. Thus, it is possible to reinforce the strength in the bent portions 20b of the subframes 20 with the engine 12. Moreover, it is possible to keep the center tunnel portion 37a of the leg shield 37 lower.

According to the motorcycle 10, the seat rails 31 extending obliquely upward to the rear are fixed to the rear side portions 20d further toward the rear than the bent portions 20b of the subframes 20. Consequently, the subframes 20 are reinforced. Therefore, it is possible to reduce a diameter of the subframes 20 while securing the strength of the entire body frame 11 and keep the center tunnel portion 37a of the leg shield 37 lower.

According to the motorcycle 10, the portions further toward the rear than the bent portions 20b of the subframes 20 extend to the rear of the engine 12. Both the engine 12 and the rear arms 26 are supported by the rear ends 20e of the subframes 20 via the brackets 28. Consequently, it is possible to simplify a supporting structure for the engine 12 and the like and reduce a size of the brackets 28.

The front ends 31a and 32a of the seat rails 31 and the back stays 32 extending obliquely upward to the rear are fixed to the rear ends 20e of the subframes 20. The seat rails 31 and the back stays 32 are connected to each other on the rear end sides thereof. Consequently, it is possible to reduce a diameter of the subframes 20 while securing the strength of the body frame 11 and keep the center tunnel portion 37a of the leg shield 37 lower.

The engine 12 is supported by portions near the connecting portions of the seat rails 31 and the back stays 32 in the subframes 20. Consequently, since the engine 12 is supported by portions having a high strength in the subframes 20, it is possible to reduce the thickness of the subframes 20 while securing the strength of the body frame 11.

The engine 12 is supported by the main frame 19 via the bracket 22 and supported by portions at two places separated to the front and the rear of the respective subframes 20 via the brackets 23 and the brackets 28. Thus, the engine 12 is supported by the main frame 19 and the subframes 20 in a well-balanced state. The function of the engine 12 as a reinforcing member is improved so as to make it possible to obtain a larger strength compared with a case in which the engine 12 is supported by one portion of the subframes 20.

The subframes 20 are provided on the left and the right, respectively. The pair of brackets 28 provided in the left and the right subframes 20 are interposed between the rear arms 26 supporting the rear wheel 25 and the engine 12 (see FIG. 3). Thus, it is possible to control an increase in an interval between the left and the right subframes 20 and reduce a width of the vehicle while maintaining the strength of the body frame 11.

If the brackets 28 are disposed on an outer side of the rear arms 26 and the inner cylinders 38a of the bushing 38 are directly in contact with the crankcase 12b of the engine 12, it is likely that the inner cylinders 38a made of iron cut into the crankcase 12b made of aluminum because of the tightening of the nut 30 at the time of assembly. In that case, in order to prevent the inner cylinders 38a from cutting into the crankcase 12b, it is necessary to dispose washers between the inner cylinders 38a and the crankcase 12b. However, in the motorcycle 10, the tabular brackets 28 made of iron are interposed between the inner cylinders 38a made of iron and the crankcase 12b made of aluminum. Thus, when the nut 30 is tightened, the inner cylinders 38a never cut into the crankcase 12b side. Therefore, since it is unnecessary to provide washers, it is possible to reduce the number of components.

Note that, in the motorcycle 10 according to the first preferred embodiment, the pair of symmetrical subframes 20 are provided as the pair of left and right subframes. However, the pair of left and right subframes only have to be provided on the left and the right of the vehicle and do not always have to be symmetrical.

The motorcycle 10 according to the first preferred embodiment includes the engine 12, which serves as an internal combustion engine, as the "motor". However, the motor is not limited to the engine 12 and may be another type of motor, such as an electric motor. The saddle riding type vehicle according to the preferred embodiments of the present invention is not limited to the motorcycle 10.

As described above, the present invention is useful for the saddle riding type vehicle, such as a motorcycle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A saddle riding vehicle comprising:
a head pipe that supports a steering shaft so as to rotate freely;
a body frame including a main frame that is connected to the head pipe and extends obliquely downward along a centerline of the vehicle in a width direction of the vehicle toward the rear of the vehicle, and a pair of left and right subframes that are connected to left and right sides of the main frame, respectively, and extend obliquely downward to the rear; and
a motor supported by and suspended from the main frame and the subframes such that the motor is not supported at a front of the motor or from below the motor by the body frame; wherein
the body frame does not include a downtube extending downward from the head pipe in front of the motor; and
a connecting portion of the main frame and the subframes is located ahead of a portion of the main frame supporting the motor.

2. The saddle riding vehicle according to claim 1, wherein the head pipe is connected to a front end of the main frame, and a cross sectional area of the main frame changes along a longitudinal direction of the main frame such that the front end is larger than a rear end of the main frame.

3. The saddle riding vehicle according to claim 1, wherein the main frame supports the motor at a rear end of the main frame.

4. The saddle riding vehicle according to claim 1, wherein the subframes include bent portions which are bent convexly downward and support the motor at least in one location adjacent the bent portions.

5. The saddle riding vehicle according to claim 1, wherein the subframes include bent portions which are bent convexly downward and support the motor at least in one location further toward a rear of the subframes than the bent portions.

6. The saddle riding vehicle according to claim 1, further including a rear wheel and rear arms supporting the rear wheel and extending substantially in a front to rear direction, wherein the subframe is bent convexly downward, wherein both a portion of the motor and the rear arms are supported at rear ends of the subframes.

7. The saddle riding vehicle according to claim 1, further comprising rear side frames extending obliquely upward toward the rear of the vehicle, wherein the subframes include bent portions bent convexly downward and the rear side frames are connected to a portion of the subframes further toward the rear than the bent portions.

8. The saddle riding vehicle according to claim 1, further including plural rear side frames extending obliquely upward to the rear of the vehicle, wherein the rear side frames are connected to one another and to rear ends of the subframes.

9. The saddle riding vehicle according to claim 8, wherein the subframes support the motor at least in one location adjacent connecting portions to which the rear side frames are connected to the subframes.

10. The saddle riding vehicle according to claim 1, wherein the motor is an internal combustion engine having a crankcase and a cylinder that extends obliquely upward toward the front of the vehicle from the crankcase, and the cylinder is connected to the main frame and the crankcase is connected to the subframes.

11. The saddle riding vehicle according to claim 10, wherein an axis of the cylinder extends obliquely upward toward the front of the vehicle, the subframes include bent portions bent convexly downward, and front portions of the subframes forward of the bent portions extend substantially parallel to the axis of the cylinder.

12. The saddle riding vehicle according to claim 10, wherein an axis of the cylinder extends obliquely upward to the front of the vehicle, the subframes include bent portions bent convexly downward, and the bent portions of the subframes are located above a portion of the cylinder and the crankcase in the internal combustion engine.

13. A saddle riding vehicle comprising:
a head pipe that supports a steering shaft so as to rotate freely;

a body frame including a main frame that extends obliquely downward toward the rear of the vehicle from the head pipe along a centerline of the vehicle in a width direction of the vehicle, the body frame including at least a pair of left and right side subframes connected to left and right sides of the main frame, respectively, and extend obliquely downward to the rear;

a motor supported by and suspended from the body frame such that the motor is not supported from below;

a rear wheel and left and right rear arms supporting the rear wheel and extending substantially in a front to rear direction;

left and right brackets fixed to the left and the right side subframes, respectively; and a pivot shaft that penetrates through both the left and right brackets, both the rear arms, and the motor, wherein the pivot shaft attaches both the rear arms and the motor to both the brackets in a state in which the left and the right brackets are interposed between the left and the right rear arms and the motor, respectively.

14. The saddle riding vehicle according to claim 13, wherein a portion of the motor is supported by the main frame.

15. The saddle riding vehicle according to claim 13, further comprising an air cleaner and a battery, wherein the air cleaner and the battery are arranged in a front to rear direction of the vehicle.

* * * * *